Aug. 13, 1935.   A. A. J. CARLSON   2,011,269

COMBINATION LOCK

Filed March 29, 1934

Inventor:
Axel Alban J. Carlson,
By Clausdahl, Parker & Carlson
Attys

Patented Aug. 13, 1935

2,011,269

UNITED STATES PATENT OFFICE 2,011,269

COMBINATION LOCK

Axel Alban J. Carlson, Chicago, Ill.

Application March 29, 1934, Serial No. 717,901

13 Claims. (Cl. 70—90)

The invention pertains to a combination lock especially adapted for use in the prevention of theft of motor vehicles.

The general object of the invention is to provide a lock of this character having a locking member movable into and out of engagement with the member to be locked and carrying a plurality of individually adjustable elements normally presenting a surface formed cooperatively by the elements which prevents release of the locking member, said elements being adapted when arranged in a predetermined relation to each other and to the locking member to permit release of the latter.

It is also an object to provide a lock of this character which is inexpensive to manufacture and comprises parts compactly arranged and having a rugged construction effectively preventing forcing of the lock.

A further object is to provide a lock adapted to be mounted on the steering column of a motor vehicle, in which the locking mechanism is enclosed in a casing having a one-piece construction thereby preventing tampering with the mechanism.

Another object is to provide a permutation lock having a plurality of permutation elements provided with parts projecting from the casing for manual operation and so held by other parts of the mechanism that they cannot be shifted to permit detection of the combination.

Other objects and advantages will become apparent from the following description taken in connection with the accompanying drawing, in which.

Figure 1:
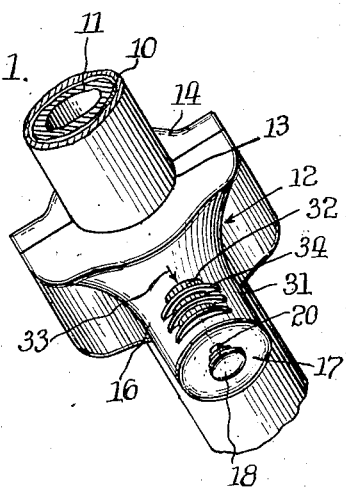
Figure 1 is a perspective view of a lock embodying the features of the invention and showing the lock mounted on the steering column of a motor vehicle.

In the drawing, a steering column of the usual type is shown which comprises a fixed sleeve 10 enclosing a rotatable steering element 11. A lock embodying the features of the present invention is adapted to be mounted on the sleeve 10 and includes a releasable member holding the steering element against rotation when in its locked position.

The preferred form of lock is characterized by its rugged but simple construction which permits of economical manufacture and effectively prevents forcing of the lock. As shown herein, it comprises a casing, indicated at 12, of one-piece construction shaped as at 13 to fit snugly against the sleeve 10 and secured thereto by a complementary member 14 which fits against the opposite side of the sleeve 10 and is rigidly clamped to the casing 12 and against the steering column by screws 15. The casing is shaped to provide a hollow cylindrical portion 16 extending radially from the steering column and closed at its outer end by an integral wall 17.

The interior of the portion 16 is preferably cylindrical and is open at its inner end to permit insertion of the operating mechanism of the lock. When the lock is mounted on the steering column, the inner end is closed thereby, thus making it impossible because of the one-piece construction of the casing to gain access to the interior of the casing without removing it from the steering column or cutting into the casing.

The operating mechanism mounted within the casing comprises a locking bolt 20 which is slidably supported at its outer end by the end wall 17 of the casing. At its inner end, the bolt is provided with an enlarged portion 21 adapted to extend through an aperture in the sleeve 10 of the steering column and into the steering element 11, thereby holding the steering element against rotation. When the bolt is moved outwardly of the column, the steering element is released. To move the bolt in this manner, it is provided with a knob 18 at its outer end.

Controlling the movement of the bolt 20 is a permutation mechanism comprising a plurality of individually adjustable members which, in the present instance, are rotatably mounted on the bolt as a spindle. As shown herein, the adjustable members comprise concentric sleeves 22 journalled upon the bolt 20 and upon one another. The inner end faces of the sleeves lie in the same plane to provide a single bearing surface indicated at 23 and are provided with notches adapted when alined to form a recess 24.

Figure 2:
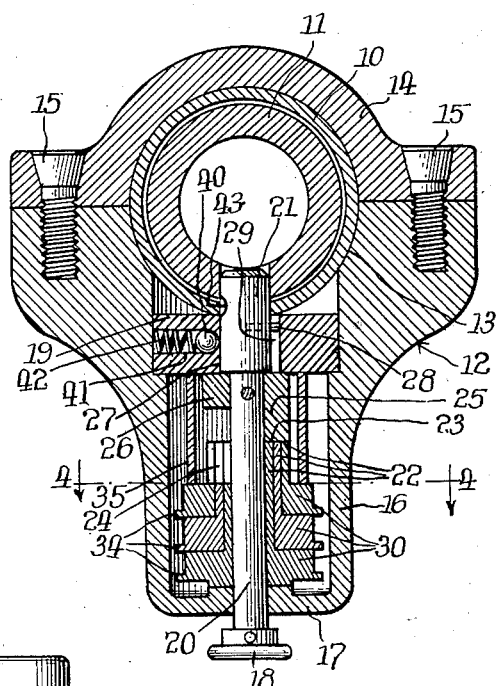
Fig. 2 is a sectional view through the steering column and lock.
Figure 3:
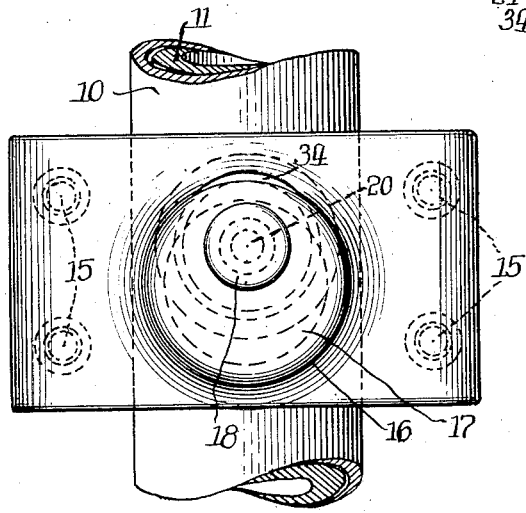
Fig. 3 is an end view of the lock.
Figure 5:
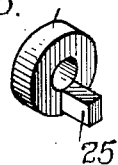
Fig. 5 is a perspective view of a part on the locking bolt.

To cooperate with said bearing surface and the recess, the bolt is provided with a part which normally abuts against said bearing surface to prevent movement of the bolt out of engagement with the steering element 11. When the sleeves are moved to a predetermined relation to provide the recess 24 and to position the recess opposite said part, the bolt may then be moved. Said part, in the present instance, is a lug 25 (see Figs. 2 and 5) formed integrally on a collar 26 pinned on the bolt and abutting the shoulder formed by the enlarged portion 21. The lug 25 is provided with a flat end face and is only slightly narrower than the recess 24 so that the sleeves must be accurately set before the lug can enter the recess.

To necessitate not only alinement of the notches in the sleeves to provide the recess 24 but also to require such alinement at a predetermined position, the bolt is held against rotation so that the lug 25 is always in one angular position. To this end, a plug 19 is provided which closes the inner end of the casing. The plug is provided with a central aperture 27 slidably receiving the inner end of the bolt and having a longitudinal slot or keyway 29 to receive a pin 28 projecting from the side of the enlarged portion 21 of the bolt. The latter is thus free to slide but is held against rotation.

Figure 4:
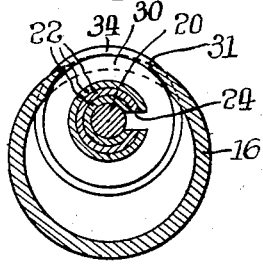
Fig. 4 is a sectional view taken on the line 4—4 of Fig. 2.

The sleeves 22 are so constructed that they may be individually adjusted. Preferably the sleeves have parts for manual operation projecting from the casing in such position that the end thereof opposite the bearing surface 23 may abut against a fixed surface such as the end wall 17 to prevent relative longitudinal shifting of the sleeves. To this end, each sleeve is provided with a radially extending flange 30. The flanges have a diameter slightly less than the internal diameter of the casing so that they may be inserted through the inner end thereof. The sleeves and the bolt, however, are positioned eccentrically of the casing in order that the flanges 30 may project through an aperture 31 in the side wall of the casing, as shown in Figs. 1 and 4, so that they may be manually adjusted. Each flange has on its periphery a scale 32, which cooperates with a fixed mark such as the arrow 33 on the exterior of the casing to permit setting the sleeve. The flange also may have a peripheral rib 34 which is preferably knurled so that it may be easily turned. The aperture 31 is notched at the side edges to receive the ribs 34, so that the casing will fit closely against the scale portions 32 as well as the ribs 34 of the flanges 30.

The sleeves are all held in abutment with one another and with the end wall 17, to prevent any relative endwise shifting, by the plug 19 which abuts against the collar 26 and holds the lug 25 in bearing engagement with the bearing surface 23 formed by the sleeves. Thus, one sleeve cannot be shifted longitudinally of the others so that the lug 25 will bear against that one sleeve alone and thereby permit detection of the location of its notch. A spacer comprising a hollow cylindrical member 35 interposed between the plug 19 and the nearest flange 30 may also be provided for this purpose if desired.

When the bolt 20 is withdrawn to permit operation of the steering mechanism, it is desirable to restrain the bolt against inward movement so that the steering mechanism cannot accidentally become locked while the vehicle is being operated. To this end, means is provided for yieldably holding the bolt in its outer or withdrawn position comprising a ball 40 positioned in a hole 41 in the plug 19 and urged toward the bolt by a spring 42. Cooperating with the ball 40 is a recess 43 in the bolt positioned to receive the ball when the bolt is withdrawn and thereby yieldably hold the bolt in its withdrawn position.

To operate the lock, the scales 32 on the sleeves are set in a predetermined manner to aline the notches in the end faces of the sleeves opposite the lug 25. The locking bolt 20 may then be moved outwardly to release the steering element 11, the lug 25 entering the recess 24 on such movement. To relock the steering element, the bolt is pushed inwardly, removing the lug 25 from the recess 24. The sleeves may then be rotated to disaline the notches. If it is then attempted to withdraw the bolt, the lug 25 bears against the single bearing surface 23 formed by the end faces of the sleeves, and movement of the bolt is prevented.

It is to be noted that the parts of the device are all of rugged construction. Moreover, it is apparent that the parts cooperate in such a manner that they will resist any attempt to force the lock. The locking mechanism is enclosed within the casing which has a one-piece construction thereby preventing access to the interior thereof without cutting the casing or completely removing it from the steering column. The permutation members, namely the sleeves 22, are held against longitudinal shifting by the plug 19, the collar 26, and the end wall 17, or by the spacer 35, so that one sleeve cannot be moved relative to another to a position where its notch could be detected.

The lock is simple to construct, as is evident from the nature of its parts, and may be easily assembled since the parts comprising the operating mechanism may be readily inserted into the casing from the inner end thereof. When assembled, the parts are all rigidly held in place by the plug 19.

I claim as my invention:

1. A lock of the character set forth comprising in combination, a manually operable locking member movable endwise and held against rotation, a plurality of individually rotatable concentric sleeves journalled on said locking member and upon one another and having end faces lying in the same plane to provide a single bearing surface shaped to form in a predetermined rotational relation of said elements a recess in said surface, and a collar rigidly mounted on said locking member having a longitudinally extending lug normally bearing against said surface and adapted to be received in said recess when the latter is opposite said lug to permit said locking member to be moved endwise.

2. A lock for the steering mechanism of a motor vehicle having a steering column and a steering element within said column comprising, in combination, a casing adapted to be rigidly attached to the steering column to extend radially therefrom and having an integral end wall at its outer end with its inner end opening toward the steering column, said casing having an aperture in the side wall thereof, a locking bolt adapted to extend through the steering column and into the steering element to lock the latter against movement and slidably supported in said end wall, and a plurality of sleeves rotatably mounted on said locking member and having portions extending through said aperture in the side wall, said sleeves having cooperating end faces adapted to provide a single bearing surface and shaped to provide in a predetermined relation of said sleeves a recess in said surface, said locking bolt having a part adapted to be received in said recess to permit withdrawal of said locking bolt from said steering element.

3. A lock for the steering mechanism of a motor vehicle having a steering column and a steering element within said column comprising, in combination, a casing adapted to be rigidly secured to the steering column and having integral end and side walls, the inner end being open to permit insertion of the parts of the lock, the side wall having an aperture therein, a locking bolt for locking the steering element against movement and slidably supported at one end by said end wall, a plurality of sleeves concentrically and rotatably mounted on said bolt adjacent said end wall and having flanges projecting partially through said aperture in the side wall for individual manual adjustment of said sleeves, a lug rigid with said locking bolt and positioned inwardly of said sleeves, the end faces of said sleeves normally preventing outward movement of said lug but providing in a predetermined relation of said sleeves a recess to receive said lug to permit withdrawal of the bolt from the steering element, and a plug closing the inner end of said casing and slidably and non-rotatably supporting the inner end of the bolt.

4. A lock of the character set forth comprising, in combination, a casing having a side wall and a wall at one end integral with the side wall, the other end being open, said side wall having an aperture therein adjacent said end wall, a locking bolt slidably supported at one end in said end wall, a plurality of concentric sleeves having radially extending flanges projecting through said aperture and rotatably mounted on said bolt with the adjacent flange in abutment with said end wall, the opposite end of said sleeves together forming a single bearing surface and shaped to provide in one predetermined relation of the sleeves a recess, a lug rigid with said bolt and positioned to bear against said surface to prevent movement of the bolt but adapted to enter the recess to permit movement of the bolt, a plug rigidly mounted in the open end of said casing and slidably and non-rotatably supporting said bolt, and a spacer for holding the flanges of the sleeves in abutment with one another comprising a sleeve interposed between said plug and the flange nearest thereto.

5. A lock for the steering mechanism of a motor vehicle having a steering column and a steering element within said column comprising, in combination, a casing adapted to be rigidly secured to the steering column and having integral end and side walls, the inner end being open to permit insertion of the parts of the lock, the side wall having an aperture therein, a locking bolt adapted to engage said steering element to hold it against movement, said bolt being supported at its outer end by said end wall, a plurality of rotatable permutation elements having flanges projecting partially through said aperture in the side wall for individual manual adjustment, said permutation elements normally preventing outward movement of said bolt but permitting in one predetermined relation withdrawal of the bolt from the steering element, and a plug closing the inner end of said casing and supporting the inner end of said bolt.

6. A lock for the steering mechanism of a motor vehicle having a steering column and a steering element within said column comprising, in combination, a manually operable locking member normally engaging said steering element to hold it against movement and adapted to be moved endwise out of engagement with said steering element to permit movement thereof, a plurality of individually rotatable concentric sleeves journalled on said locking member and upon one another and having end faces lying in the same plane to provide a single bearing surface shaped to form in one predetermined relation of said sleeves a recess in said surface, and a lug on said locking member normally bearing against said surface whereby endwise movement of the locking member is prevented but adapted to enter said recess to permit disengagement of said locking member from said steering element.

7. A lock of the character set forth comprising, in combination, a casing having an end wall, a locking bolt slidably supported relative to said end wall, a plurality of sleeves mounted for rotation on the axis of said bolt in abutment at one end with said end wall, the other ends of said sleeves together forming a single bearing surface shaped in a predetermined relation of the sleeves to provide a recess, a part on said bolt normally abutting against said bearing surface but adapted to enter said recess to permit movement of the bolt, and means rigid with said casing for holding said part in abutment with said bearing surface and said sleeves in abutment with said end wall whereby relative endwise shifting of the sleeves is prevented.

8. A lock of the character set forth comprising, in combination, a casing having an end wall, a locking bolt slidably supported at one end by said end wall, a plurality of sleeves rotatably mounted on said bolt in abutment at one end with said end wall, the other ends of said sleeves together forming a single bearing surface shaped in a predetermined relation of the sleeves to provide a recess, a collar rigid with said bolt having a lug extending longitudinally and normally abutting against said bearing surface but adapted to enter said recess to permit movement of the bolt, and a plug in the other end of the casing abutting against said collar for holding said lug in abutment with said bearing surface and said sleeves in abutment with said end wall whereby relative endwise shifting of the sleeves is prevented.

9. A lock of the character set forth comprising, in combination, a casing having an end wall and a side wall with an aperture in the side wall, a locking bolt slidably supported at one end in said end wall, a plurality of rotatable sleeves journaled on said bolt and upon one another, each sleeve having at one end a flange extending through said aperture for individual manual adjustment thereof, the flanges abutting against one another with the flange on the inner sleeve abutting against said end wall, the other ends of said sleeves together forming a single bearing surface shaped in a predetermined relation of the sleeves to provide a recess, a part on said bolt normally abutting against said bearing surface but adapted to enter said recess to permit movement of the bolt, and a member fixed in said casing for holding said part in abutment with said bearing surface and the flanges in abutment with one another and the end wall whereby relative endwise shifting of the sleeves is prevented.

10. A lock of the character set forth comprising, in combination, a casing, a member mounted in said casing and movable in the operation of the lock, a plurality of concentric sleeves mounted for rotation in said casing and having parts projecting from said casing for manual operation, means providing a fixed abutment at one end of said sleeves, the other ends of said sleeves together forming a single bearing surface shaped in a predetermined relation of the sleeves to provide a recess, a part on said member normally abutting against said bearing surface but adapted to enter said recess to permit movement of said member, and fixed means for holding said part in abutment with said bearing surface and said sleeves in abutment with said first mentioned means whereby relative endwise shifting of the sleeves is prevented.

11. A lock for the steering mechanism of a motor vehicle having a steering column and a steering element within said column comprising, in combination, a casing rigidly secured to said steering column, a locking member in said casing normally engaging said steering element to hold it against movement and adapted to be moved endwise out of engagement with said steering element to permit movement thereof, a plurality of individually rotatable concentric sleeves mounted for rotation in said casing, means rigid with said casing providing an abutment at one end of said sleeves, the other ends of said sleeves together forming a single bearing surface shaped in a predetermined relation of the sleeves to provide a recess, a part on said member normally abutting against said bearing surface but adapted to enter said recess to permit movement of the locking member, and a member rigid with said casing for holding said part in abutment with said bearing surface and said sleeves in abutment with said means whereby relative endwise shifting of the sleeves is prevented.

12. A lock of the character set forth comprising, in combination, a casing, a manually operable locking member movable endwise in said casing, a plurality of individually rotatable concentric sleeves journalled in said casing on said locking member and upon one another and having end faces lying in the same plane to provide a single bearing surface shaped to form in a predetermined rotational relation of said sleeves a recess in said surface, a collar rigidly mounted on said locking member having on one end face a longitudinally extending lug normally bearing against said surface and adapted to be received in said recess when the latter is opposite said lug to permit said locking member to be moved endwise, and a member rigid with said casing bearing against the other end face of said collar to provide a backing therefor preventing longitudinal movement of said lug away from said bearing surface.

13. A lock of the character set forth comprising, in combination, a casing, a locking bolt mounted in said casing, a plurality of individually rotatable concentric sleeves mounted in said casing, means including a fixed abutment for holding the sleeves against longitudinal movement relative to each other, the end faces at one end of said sleeves together forming a single bearing surface and shaped to provide a recess in a predetermined relation of said sleeves, and means interposed between said abutment and said bearing surface including a lug normally held against said bearing surface by said abutment and movable into said recess by movement of the bolt.

AXEL ALBAN J. CARLSON.